United States Patent
Kyou et al.

(10) Patent No.: US 11,368,923 B2
(45) Date of Patent: Jun. 21, 2022

(54) WIRELESS COMMUNICATION APPARATUS, ELECTRONIC TIMEPIECE, TRANSMISSION POWER CONTROL METHOD, AND STORAGE MEDIUM

(71) Applicant: CASIO COMPUTER CO., LTD., Tokyo (JP)

(72) Inventors: Kazuho Kyou, Tachikawa (JP); Sadao Nagashima, Tokorozawa (JP); Hiroshi Iwamiya, Ome (JP); Toshihiro Takahashi, Kunitachi (JP); Takahiro Tomida, Hamura (JP); Tsutomu Terazaki, Saitama (JP); Ryo Okumura, Kodaira (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 210 days.

(21) Appl. No.: 16/590,052

(22) Filed: Oct. 1, 2019

(65) Prior Publication Data
US 2020/0107273 A1 Apr. 2, 2020

(30) Foreign Application Priority Data
Oct. 2, 2018 (JP) .............................. JP2018-187511

(51) Int. Cl.
*H04W 52/24* (2009.01)
*H04W 72/04* (2009.01)
(Continued)

(52) U.S. Cl.
CPC ........... *H04W 52/245* (2013.01); *H04W 4/80* (2018.02); *H04W 8/005* (2013.01); *H04W 72/0473* (2013.01)

(58) Field of Classification Search
CPC . H04W 4/80; H04W 52/245; H04W 72/0473; H04W 8/005; H04W 52/228; H04W 52/383; H04W 52/50
See application file for complete search history.

(56) References Cited

U.S. PATENT DOCUMENTS 6,856,789 B2  2/2005  Pattabiraman et al.
8,554,259 B2  10/2013  Ramasamy et al.
(Continued)

FOREIGN PATENT DOCUMENTS

EP    3062174 A1    8/2016
JP    2012142877 A  7/2012
WO    03085897 A1   10/2003

OTHER PUBLICATIONS

Extended European Search Report (EESR) dated Feb. 28, 2020 issued in counterpart European Application No. 19198934.2.

*Primary Examiner* — Kevin C. Harper
*Assistant Examiner* — Derrick V Rose
(74) *Attorney, Agent, or Firm* — Holtz, Holtz & Volek PC

(57) ABSTRACT

A wireless communication apparatus includes a wireless communicator configured to perform wireless communication with another wireless communication apparatus, and a processor. The processor controls the wireless communicator to transmit to the other wireless communication apparatus prescribed information while incrementally changing transmission power by a prescribed degree until a change occurs in a signal reception state of a connection request from the other wireless communication apparatus, and starts transmission of the prescribed information to the other wireless communication apparatus during a next communication onwards at a transmission power based on a transmission power occurring when the change occurs in the signal reception state of the connection request.

12 Claims, 7 Drawing Sheets

(51) Int. Cl.
*H04W 4/80* (2018.01)
*H04W 8/00* (2009.01)

(56) References Cited

U.S. PATENT DOCUMENTS

| | | |
|---|---|---|
| 10,054,910 B2 | 8/2018 | Nagareda |
| 2011/0143805 A1 | 6/2011 | Ramasamy et al. |
| 2012/0275360 A1* | 11/2012 | Berenberg ........ H04W 52/0241 370/311 |
| 2014/0106810 A1 | 4/2014 | Ramasamy et al. |
| 2015/0358780 A1* | 12/2015 | Saari ........................ H04W 4/02 370/252 |
| 2017/0303070 A1* | 10/2017 | Batra .................... H04W 76/14 |
| 2018/0006746 A1* | 1/2018 | Yasuzaki ............ H04N 1/00307 |

* cited by examiner

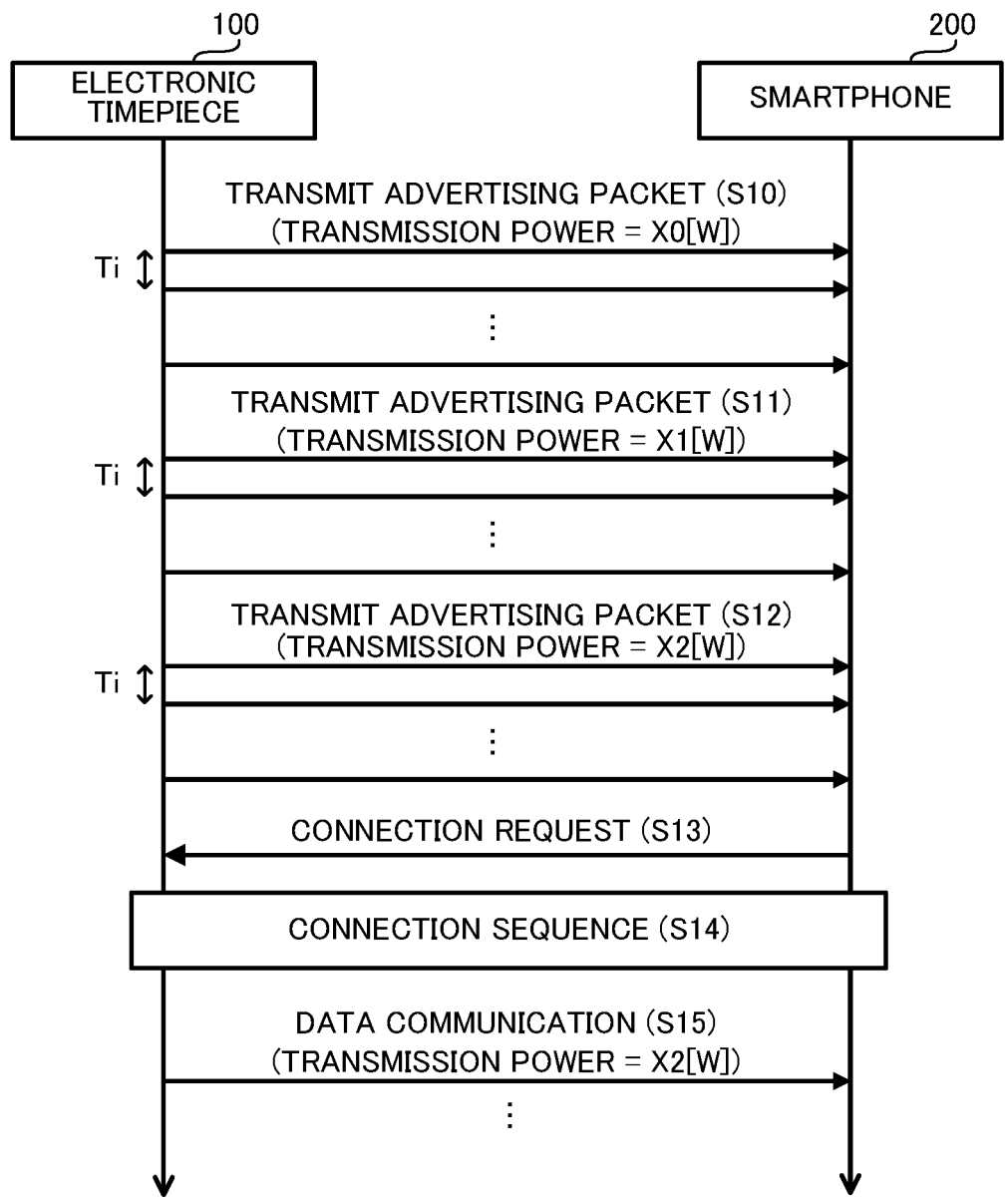

WIRELESS COMMUNICATION APPARATUS, ELECTRONIC TIMEPIECE, TRANSMISSION POWER CONTROL METHOD, AND STORAGE MEDIUM

CROSS-REFERENCE TO RELATED APPLICATION

This application claims the benefit of Japanese Patent Application No. 2018-187511, filed on Oct. 2, 2018, the entire disclosure of which is incorporated by reference herein.

FIELD

Technical field relates generally to a wireless communication apparatus, an electronic timepiece, a transmission power control method, and a storage medium.

BACKGROUND

Bluetooth (registered trademark) Low Energy (BLE) is one short range wireless communication standard, and is known heretofore for use in establishing a connection between a slave device and a master device by the slave device broadcasting an advertising packet intermittently at a prescribed period in order for the master device to discover the slave device, as for example, in Unexamined Japanese Patent Application Kokai Publication No. 2012-142877.

When the communication environment changes during communication using conventional BLE, such as when a distance between the wireless communication apparatuses changes after the establishment of the connection between the wireless communication apparatuses, maintaining of the connection between the wireless communication apparatuses may be difficult. Conversely, power may be wastefully consumed when the connection between the wireless communication apparatuses is good and continues at a fixed transmission power. In communication particularly between wireless communication apparatuses that are envisioned to be used under certain fixed conditions, prediction of and control at a suitable transmission power are required.

SUMMARY

A wireless communication apparatus according to one embodiment includes (i) a wireless communicator configured to perform wireless communication with another wireless communication apparatus and (ii) a processor. The processor controls the wireless communicator to transmit to the other wireless communication apparatus prescribed information while incrementally changing transmission power by a prescribed degree until a change occurs in a signal reception state of a connection request from the other wireless communication apparatus, and the processor starts transmission of the prescribed information to the other wireless communication apparatus during a next communication onwards at a transmission power based on a transmission power occurring when the change occurs in the signal reception state of the connection request.

BRIEF DESCRIPTION OF THE DRAWINGS

A more complete understanding of this application can be obtained when the following detailed description is considered in conjunction with the following drawings, in which:

FIG. 3A is a sequence diagram illustrating operations of connection processing occurring during a first-time connection between an electronic timepiece 100 and a smartphone 200;

DETAILED DESCRIPTION

A wireless communication system according to the embodiments is described hereinafter with reference to drawings.

Figure 1:
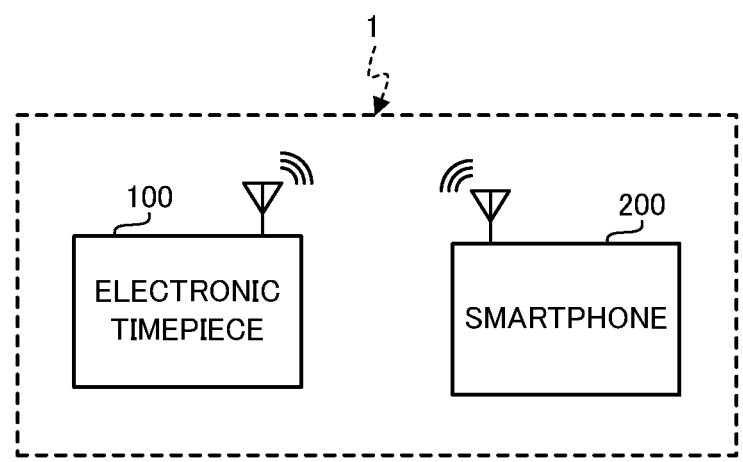
FIG. 1 is a drawing illustrating configuration of a wireless communication system according to an embodiment.

As illustrated in FIG. 1, a wireless communication system 1 includes an electronic timepiece 100 and a smartphone 200. The electronic timepiece 100 and the smartphone 200 perform wireless communication with each other on the basis of Bluetooth (registered trademark) Low Energy (referred to hereinafter as "BLE"). BLE is a standard (mode) issued with an objective of low power consumption for the short range wireless communication standard termed Bluetooth (registered trademark). In the present embodiment, the electronic timepiece 100 operates as a peripheral device that transmits a below-described advertising packet based on BLE. Moreover, the smartphone 200 operates as a central device that receives the advertising packet.

Hardware configuration of the electronic timepiece 100 according to the present embodiment is described below with reference to FIG. 2.

Figure 2:
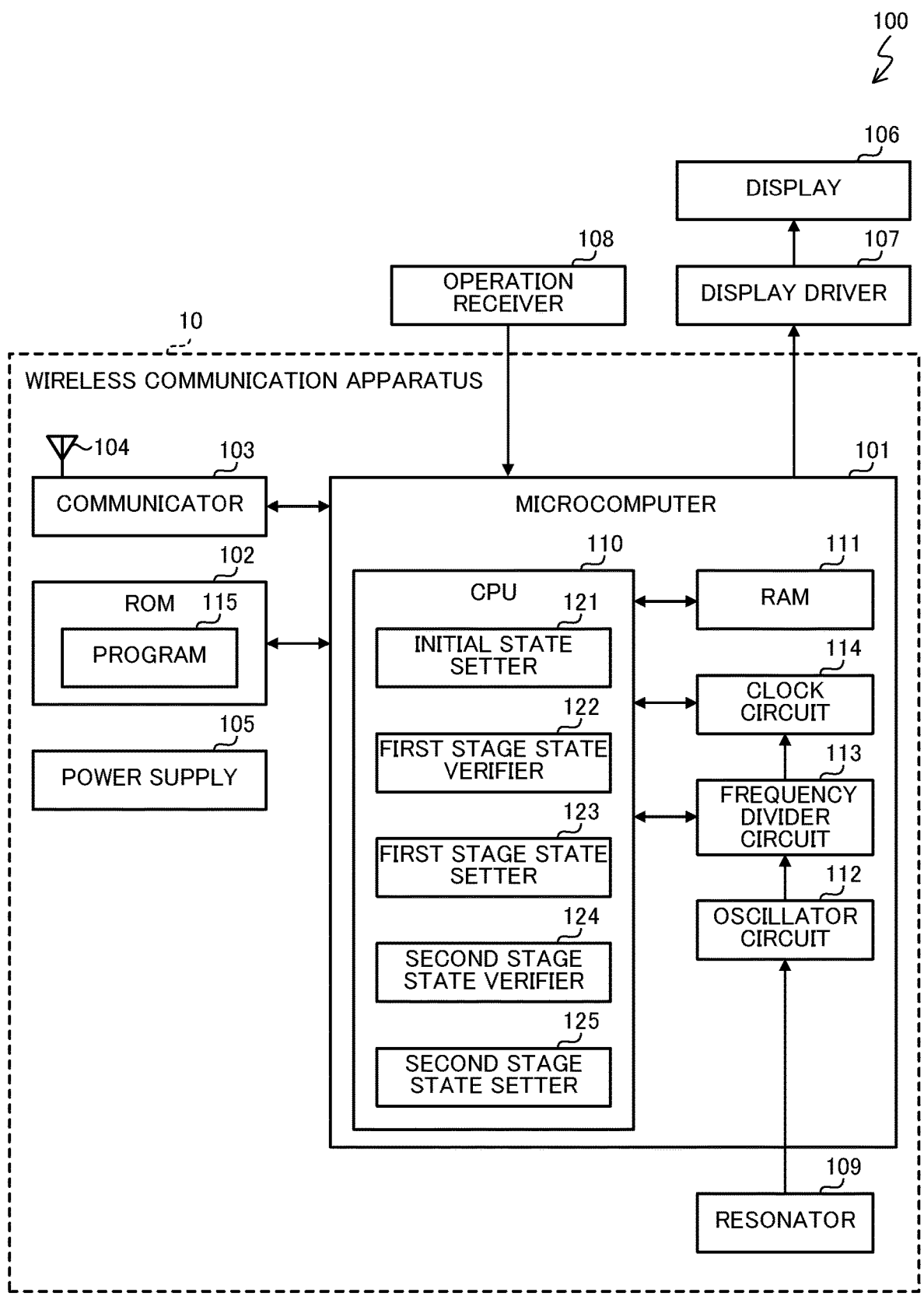
FIG. 2 is a schematic block diagram illustrating configuration of an electronic timepiece.

As illustrated in FIG. 2, the electronic timepiece 100 is equipped with a microcomputer 101, a read only memory (ROM) 102, a communicator 103, an antenna 104, a power supply 105, a display 106, a display driver 107, an operation receiver 108, and a resonator 109. The microcomputer 101, the ROM 102, the communicator 103, the antenna 104, the power supply 105, and the resonator 109 are included in a wireless communication apparatus 10 that is an example of the wireless communication apparatus of the embodiment.

The microcomputer 101 is equipped with a central processing unit (CPU) 110 as a processor, a random access memory (RAM) 111 as storage, an oscillator circuit 112, a frequency divider circuit 113, and a clock circuit 114. Although the RAM 111, the oscillator circuit 112, the frequency divider circuit 113, and the clock circuit 114 are described as being provided within the microcomputer 101, such components may be provided outside the microcomputer 101. Although the ROM 102, the communicator 103, the power supply 105, the display driver 107, and the resonator 109 are described as being provided outside the microcomputer 101, such components may be provided within the microcomputer 101.

The CPU 110 is a processor that executes various types of calculation processing and performs integrated control of overall processing of the electronic timepiece 100. The CPU 110 reads control programs from the ROM 102, loads the read control programs into the RAM 111, and performs processing for various types of operations, such as the display of time and calculation control and display in accordance with various types of functions. The CPU 110 controls the communicator 103 and performs connection and data communication with the smartphone 200.

The RAM 111 is volatile memory such as static random access memory (SRAM) or dynamic random access memory (DRAM), provides a memory space for use in operations by the CPU 110, stores temporary data, and stores various types of setting data.

The oscillator circuit 112 uses oscillation of the resonator 109 to generate and output a signal of a certain frequency, that is, a clock signal. The oscillator circuit 112, for example, may use a quartz resonator.

The frequency divider circuit 113 divides the frequency signal input from the oscillator circuit 112 and outputs a signal of the frequency used by the clock circuit 114 and the CPU 110. The frequency of this output signal may be varied on the basis of a setting by the CPU 110.

The clock circuit 114 measures the present time by adding to an initial value a count of the number of times of input of a certain clocking signal input from the frequency divider circuit 113. The clock circuit 114 may be provided by software that performs conversion of a value stored in the RAM 111, or alternatively, may include a dedicated counter circuit. The time measured by the clock circuit 114 may be an accumulating period after a certain timing, the coordinated universal time (UTC, Greenwich Mean Time), a local time of a predetermined region, or the like, without particular limitation. Moreover, the time retained by the clock circuit 114 is not necessarily retained in year-month-day-hour-minute-second format.

The ROM 102 is mask ROM, rewritable non-volatile memory, or the like, and stores control programs and/or initial setting data. The control programs include a program 115 for control of various types of processing for receiving time information from the smartphone 200 and for conversion of the time measured by the electronic timepiece 100.

The communicator 103, for example, includes a memory circuit and a radio frequency (RF) circuit or a baseband (BB) circuit. The communicator 103 performs transmission and reception of the wireless signal via the antenna 104 based on BLE. Further, the communicator 103 demodulates, decodes, or the like the wireless signal received from the outside via the antenna 104, and sends the resultant signal to the CPU 110. Moreover, the communicator 103 performs operations such as encoding and modulating the signal sent from the CPU 110, and transmits the resultant signal to the outside via the antenna 104. Further, the communicator 103 measures a receive signal strength indication (RSSI) indicating strength of the wireless signal received from the smartphone 200 as an example of quality of communication with the smartphone 200.

The power supply 105 is equipped with a battery and supplies power for operations of the electronic timepiece 100 at the operational voltage of the various components. A primary battery such as a button-type dry cell battery is used as the battery of the power supply 105 in the present embodiment. A solar panel and a secondary battery may be used as the battery, and the secondary battery may charge and discharge in accordance with an amount of electromotive power from light entering the solar panel.

The display 106 is provided with a display screen such as a liquid crystal display (LCD) or an organic electo-luminescent (EL) display, and performs digital display of data according to time or various types of functions by using the dot matrix method, segment method, or a combination of such methods. The display driver 107 performs display on the display screen by sending output of a driving signal in accordance with the type of the display screen to the display 106 on the basis of the control signal from the CPU 110. Alternatively, the display 106 may have an analog type configuration that performs display by causing rotation of multiple watch hands by a stepping motor via a gear train.

The operation receiver 108 receives an operation from a user, and outputs to the CPU 110 as an input signal an electric signal in accordance with this input operation. This operation receiver 108, for example, includes components such as a push button or winding crown. The operation receiver 108 may be configured to include a touch panel formed from touch sensors that are provided so as to overlap the display screen of the display 106. In this case, the operation receiver 108 outputs to the CPU 110 an operation signal in accordance with a detection result from the touch sensor, such as a touch position, touch state, or touch mode of the user touching the touch panel.

Functional configuration of the CPU 110 of the electronic timepiece 100 according to a first embodiment is described next.

The CPU 110 functions as an initial state setter 121, a first stage state verifier 122, a first stage state setter 123, a second stage state verifier 124, and a second stage state setter 125. These functions may be achieved by a single CPU, or alternatively, may be achieved separately by individual CPUs. Moreover, these functions may be achieved by a processor other than the microcomputer 101, such as the CPU of the communicator 103.

The CPU 110 as the initial state setter 121 sets the electronic timepiece 100 to the initial state. In the present embodiment, the initial state is the state in which the electronic timepiece 100 executes a standard function of a watch, and the standard function, for example, is a time display function for display of time. When power is turned ON to the electronic timepiece 100, for example, the CPU 110 sets the electronic timepiece 100 to the initial state.

The CPU 110 as the first stage state verifier 122 executes verification for transitioning the electronic timepiece 100 from the initial state to the first stage state. In the present embodiment, the first stage state is a state that enables a prescribed function to be executed by the electronic timepiece 100 in cooperation with the smartphone 200. Here, the prescribed function occurring in the first stage state, for example, is a notification function to provide a notification to the electronic timepiece 100 from the smartphone 200 via BLE.

An example of a method for verification of the first stage state is described hereinafter. Firstly, in the initial state of the electronic timepiece 100, the CPU 110 determines whether the electronic timepiece 100 is being worn on an arm of the user. The CPU 110 can determined whether the electronic timepiece 100 is being worn on the arm of the user by sensing of touch by a static capacitance type touch sensor provided on a buckle part, for example. Whether the electronic timepiece 100 is being worn by the user on the arm may be determined by a temperature sensor attached to a back cover of the electronic timepiece 100 sensing body temperature of a human, or sensing temperatures in the vicinity of body temperature for a prescribed period.

Thereafter, upon determination by the CPU 110 that the electronic timepiece 100 is worn on the arm of the user, the CPU 110 commands the communicator 103 to transmit repeatedly to the smartphone 200 at prescribed intervals an advertising packet while setting transmission power to a transmission power setting value stored in the RAM 111, for example. The advertising packet is an example of prescribed information for transmission by the electronic timepiece 100 to the smartphone 200. In the case in which the transmission power setting value is not recorded in RAM 111 such as during first-time connection with the smartphone 200, for example, the CPU 110 commands the communicator 103 to transmit the advertising packet using a predetermined initial value as the transmission power. The initial value of the transmission power, for example, is a lower limit of power for transmission of the advertising packet. Upon reception of the connection request from the smartphone 200 that is the transmission destination of the advertising packet, the CPU 110 commands the communicator 103 to establish the connection with the smartphone 200 and stop the transmission of the advertising packet. Thereafter, the CPU 110 updates the transmission power setting value to the value of the transmission power at the time of reception of the connection request. Then the CPU 110 ends the verification of the first stage state. However, in the case in which the connection request from the smartphone 200 is not received even after passage of a prescribed period after the start of transmission of the advertising package, the CPU 110 increases the transmission power of the advertising packet by a prescribed value. Then the CPU 110 commands the communicator 103 to stop the transmission of the advertising packet when the connection request is not received before passage of a timeout period. In this manner, the transmission power of the advertising packet is increased incrementally until the CPU 110 receives the connection request from the smartphone 200.

The CPU 110 as the first stage state setter 123, after verification of the first stage state, sets the electronic timepiece 100 to the first stage state. Thereafter, the CPU 110 transmits to the smartphone 200 using transmission power of the value to which the transmission power setting value is set during the first stage state. In the first stage state, upon reception of a cancellation notification from the smartphone 200 or determination that the electronic timepiece 100 is removed from the arm of the user, the CPU 110 cuts off the connection with the smartphone 200 and returns to the initial state. The cancellation notification from the smartphone 200 is transmitted to the electronic timepiece 100 from the smartphone 200, for example, when a RSSI measured by the smartphone 200 is sensed to be outside a prescribed range. Whether the electronic timepiece 100 is removed from the arm of the user can be sensed by the same above-mentioned methods for determination of whether the electronic timepiece 100 is being worn.

The CPU 110 as the second stage state verifier 124 executes verification for transitioning of the electronic timepiece 100 from the first stage state to the second stage state. In the present embodiment, the second stage state is a state that enables execution of a prescribed function by the electronic timepiece 100 in cooperation with the smartphone 200. Here, examples of the prescribed function in the second stage state include a setting-change function for an application by BLE.

An example of a method for verification of the second stage state is described hereinafter. Firstly, the CPU 110 measures the RSSI when the electronic timepiece 100 is in the first stage state, and determines whether the measurement value is stable. For example, the CPU 110 determines that the RSSI is stable when the measurement value of the RSSI continues to be within a prescribed range over a prescribed period. Upon determination that the RSSI is not stable, the CPU 110 controls the transmission power such that the RSSI stabilizes. In the present embodiment, the CPU 110 causes increase in the transmission power by prescribed value increments until the RSSI is at least above a lower limit of a prescribed range. Moreover, in the case in which the RSSI exceeds an upper limit value of the prescribed range, the CPU 110 causes a decrease in the transmission power by prescribed value increments until the RSSI is no more than the upper limit value of the prescribed range. Thereafter, upon determination that the RSSI is stabilized to within the prescribed range, the CPU 110 updates the transmission power setting value to the value of the transmission power at the present time, and ends the verification of the second stage state.

The CPU 110 as the second stage state setter 125, after the verification of the first stage state, sets the electronic timepiece 100 to the second stage state. Thereafter, in the second stage state, the CPU 110 transmits to the smartphone 200 using as the transmission power the value to which the transmission power setting value is set. Moreover, upon reception of the cancellation notification from the smartphone 200 or upon determination that the electronic timepiece 100 is removed from the arm of the user in the second stage state, the CPU 110 cuts off the connection with the smartphone 200 and returns to the initial state. Whether the electronic timepiece 100 is removed from the arm of the user can be sensed by the same above-mentioned methods for determination of whether the electronic timepiece 100 is being worn. Moreover, the CPU 110 controls the transmission power so that the RSSI is within the prescribed range.

Figure 3B:
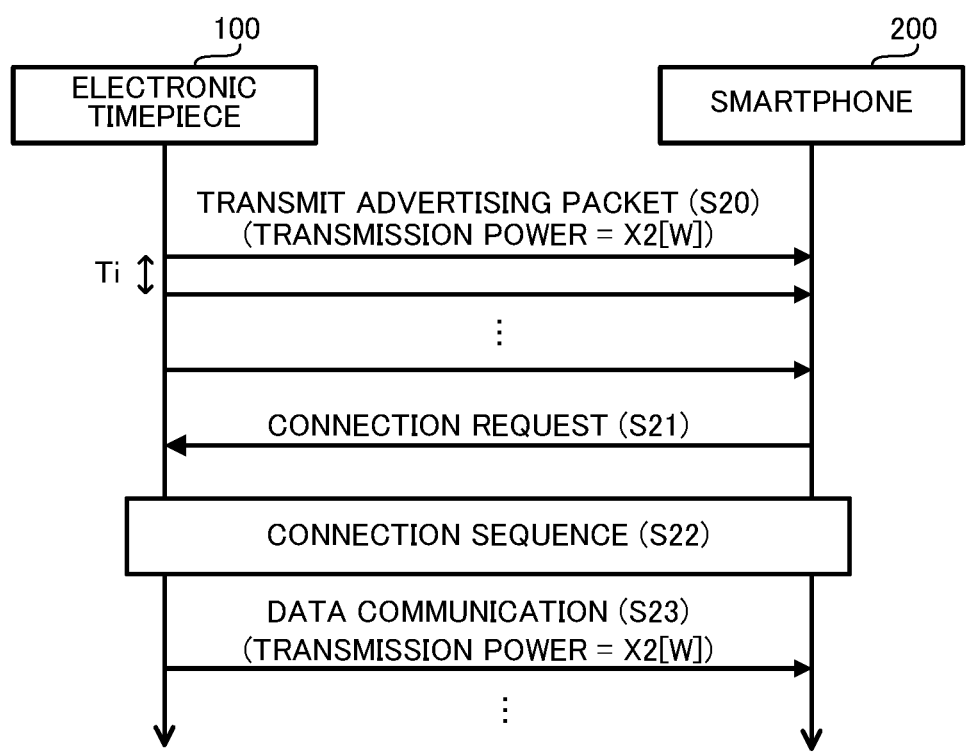
FIG. 3B is a sequence diagrams illustrating operations of connection processing occurring during a second time-onwards connection.

Operation of the wireless communication system 1 of the present embodiment is described next with reference to FIGS. 3A and 3B. FIG. 3A is a sequence diagram illustrating connection processing that occurs during first-time connection between the electronic timepiece 100 and the smartphone 200, and FIG. 3B is a sequence diagram illustrating processing that occurs during second time-onwards connection processing between the electronic timepiece 100 and the smartphone 200. Furthermore, the operation of the electronic timepiece 100 and the smartphone 200 are described here in the case in which the electronic timepiece 100 operates as the peripheral device and the smartphone 200 operates as the central device.

Upon determination during the first-time connection as illustrated in FIG. 3A that the electronic timepiece 100 is worn on the arm of the user in the initial state, the electronic timepiece 100 transmits the advertising packet at a prescribed interval Ti using as the transmission power a predetermined initial value X0 (step S10). When the connection request from the smartphone 200 is not received by the time a prescribed period is passed, the electronic timepiece 100 incrementally increases the transmission power from X0 by a prescribed value ΔX to become X1 and transmits the advertising packet at the prescribed interval Ti (step S11). When the connection request from the smartphone 200 is not received by the time of passage of the prescribed period since the updating of the transmission power, the electronic timepiece 100 updates the transmission power from X1 by incrementing by the prescribed value ΔX to become X2 and transmits the advertising packet at the prescribed interval Ti (step S12). Then upon receiving the advertising packet, the smartphone 200 transmits the connection request to the electronic timepiece 100 (step S13). The smartphone 200 and the electronic timepiece 100 upon receiving the connection request execute the connection sequence and establish the connection (step S14). Thereafter, the electronic timepiece 100 stores as the transmission power setting the transmission power X2 of the advertising packet at the time of reception of the connection request from the smartphone 200, and executes data communication with the smartphone 200 at the transmission power X2 (step S15).

Moreover, at the time of second time-onwards connection as illustrated in FIG. 3B, upon determination in the initial state that the electronic timepiece 100 is being worn by the user, the electronic timepiece 100 transmits the advertising packet at the prescribed interval Ti using the value X2 to which the transmission power setting value is set during the latest connection as the transmission power (step S20). At this time when there is no change in communication environment versus the communication environment during the latest connection, the smartphone 200 receives the advertising packet transmitted at the transmission power X2 and transmits the connection request to the electronic timepiece 100 (step S21). The electronic timepiece 100 that receives the connection request and the smartphone 200 execute the connection sequence and establish the connection (step S22). Thereafter, the electronic timepiece 100 executes data communication with the smartphone 200 at the transmission power X2 of the advertising packet used when receiving the connection request from the smartphone 200 (step S23).

Figure 4:
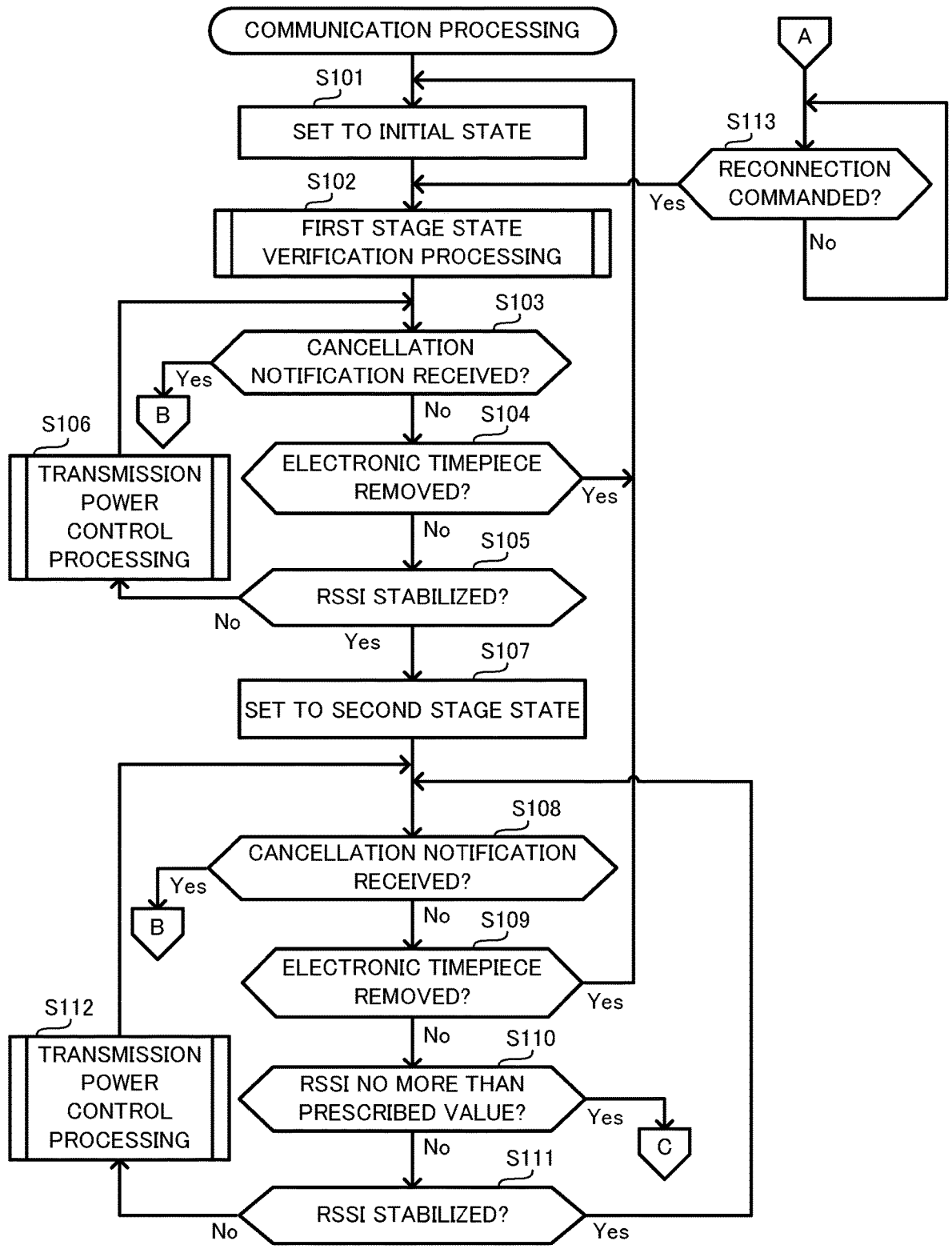
FIG. 4 is a flowchart illustrating communication processing executed by the electronic timepiece.

Operation of the electronic timepiece 100 according to the present embodiment is described next. An example of operation of the electronic timepiece 100 is described here with reference the flowchart of FIG. 4 for communication processing executed by the CPU 110 of the electronic timepiece 100. In response to the turning ON of power to the electronic timepiece 100, the CPU 110 of the electronic timepiece 100 starts communication processing.

Upon the start of communication processing, the CPU 110 sets the electronic timepiece 100 to the initial state (step S101). Then the CPU 110 executes first stage state verification processing (step S102).

Figure 5:
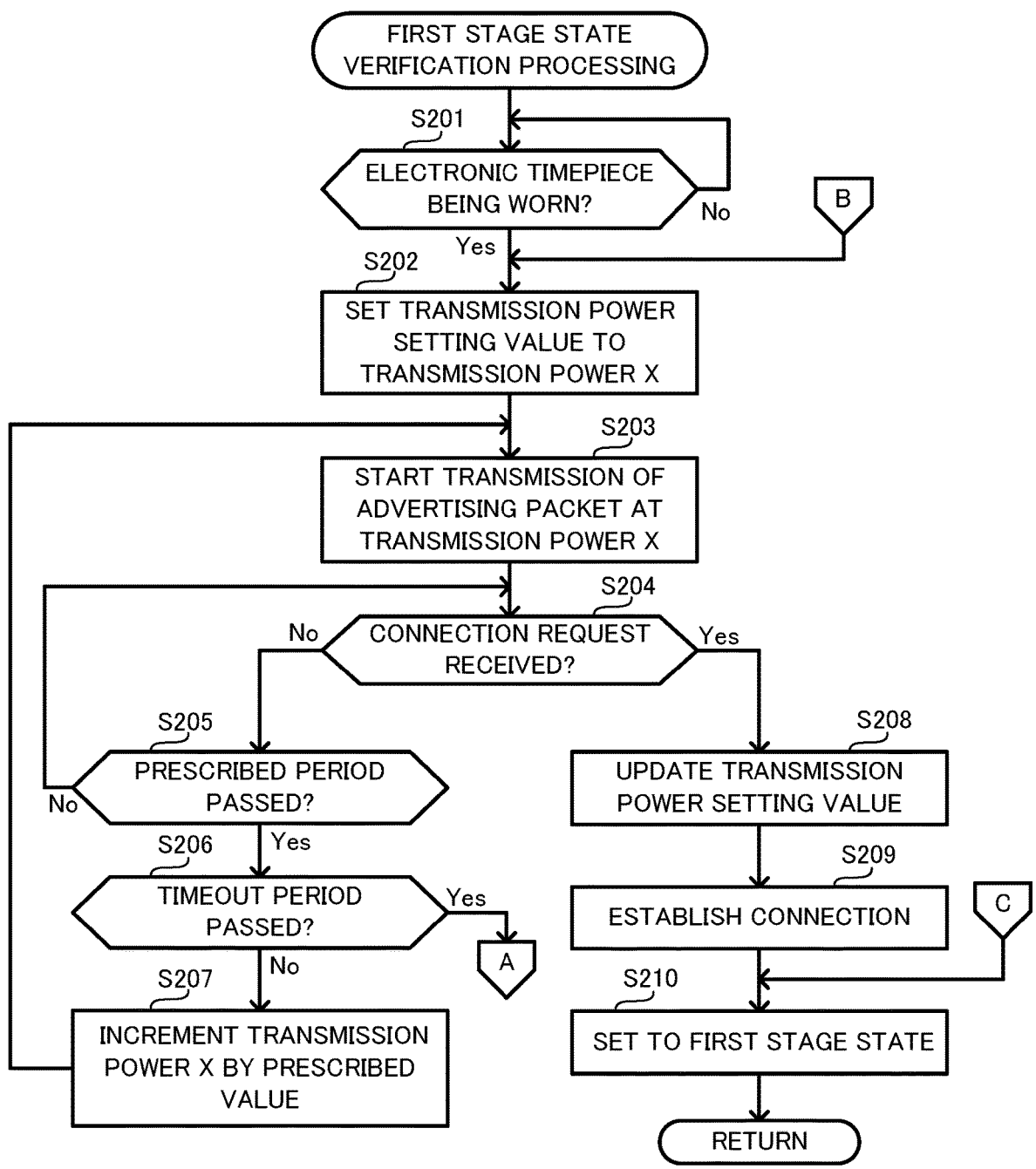
FIG. 5 is a flowchart illustrating first stage state verification processing executed by the electronic timepiece.

A flowchart of the first stage state verification processing is illustrated in FIG. 5. Upon the start of the first stage state verification processing, the CPU 110 determines whether the electronic timepiece 100 is being worn on the arm of the user (step S201). The CPU 110 waits until determination is made that the electronic timepiece 100 is being worn on the arm of the user (NO in step S201).

Upon determination that the electronic timepiece 100 is being worn on the arm of the user (YES in step S201), the CPU 110 sets the value at which the transmission power setting value is set to the transmission power X (step S202). Then the CPU 110 starts transmission of the advertising packet at the transmission power X (step S203).

The CPU 110 determines whether the connection request from the smartphone 200 is received (step S204). Upon determination that the connection request from the smartphone 200 is not received (NO in step S204), the CPU 110 determines whether a prescribed period is passed since the start of the transmission of the advertising packet at the present transmission power X (step S205). Upon determination that the prescribed period is not passed (NO in step S205), the CPU 110 continues the transmission of the advertising packet at the transmission power X until passage of the prescribed period.

Upon determination that the prescribed period is passed (YES in step S205), the CPU 110 determines whether the timeout period is passed (step S206). Upon determination that the timeout period is not passed (NO in step S206), the CPU 110 updates the transmission power X from the present transmission power X by incrementing by the prescribed value (step S207). Then the CPU 110 returns to step S203 and starts the transmission of the advertising packet at the updated transmission power X. Moreover, upon determination that the timeout period is passed (YES in step S206), the CPU 110 cuts off the connection with the smartphone 200 and waits until a command for reconnection is sent from the operation receiver 108 (NO in step S113 of FIG. 4). Then upon determination that the command for reconnection is received (YES in step S113), the CPU 110 executes the first stage state verification processing (step S102 in FIG. 4).

However, upon determination that the connection request is received (change in the signal reception state of the connection request, YES in step S204), the CPU 110 updates the transmission power setting value to the value of the present transmission power (step S208). Thereafter, the CPU 110 executes the connection sequence and establishes the connection with the smartphone 200 (step S209). Thereafter, the CPU 110 sets the electronic timepiece 100 to the first stage state (step S210), and proceeds to the processing of step S103 in FIG. 4.

Again with reference to FIG. 4, the CPU 110 determines whether the cancellation notification is received from the smartphone 200 (step S103). Upon determination that the cancellation notification is received from the smartphone 200 (YES in step S103), the CPU 110 cuts off the connection to the smartphone 200, returns to the initial state, and proceeds to step S202 of FIG. 5.

Upon determination that the cancellation notification is not received from the smartphone 200 (NO in step S103), the CPU 110 determines whether the electronic timepiece 100 is removed from the arm of the user (step S104). Upon determination that the electronic timepiece 100 is removed from the arm of the user (YES in step S104), the CPU 110 cuts off the connection with the smartphone 200, returns to step S101, and performs setting to the initial state.

Upon determination that the electronic timepiece 100 is removed from the arm of the user (NO in step S104), the CPU 110 determines whether the RSSI is stabilized to within the prescribed range (step S105). Upon determination that the RSSI is not stabilized to within the prescribed range (NO in step S105), the CPU 110 executes transmission power control processing (step S106).

Figure 6:
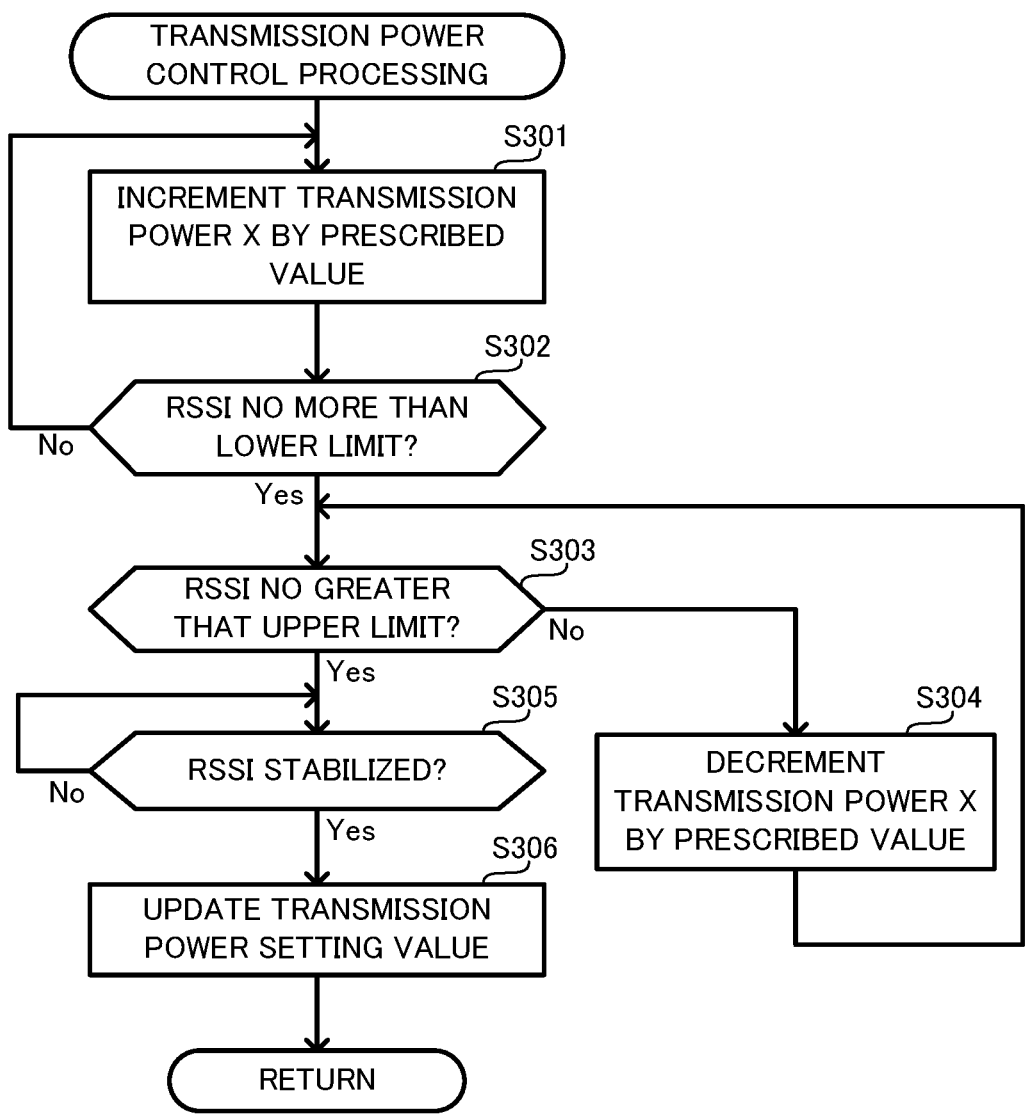
FIG. 6 is a flowchart illustrating transmission power control processing executed by the electronic timepiece.

A flowchart of the transmission power control processing is illustrated in FIG. 6. Upon the start of the transmission power control processing, the CPU 110 increments the present transmission power X by the prescribed value (step S301).

Thereafter, the CPU 110 determines whether the present RSSI is at a value that is at least the lower limit of the prescribed range (step S302). Upon determination that the present RSSI is not at least the lower limit of the prescribed range (NO in step S302), the CPU 110 returns to the processing of step S301 and causes incrementing again of the transmission power X by the prescribed value.

Upon determination that the present RSSI value is at least the lower limit value of the prescribed range (YES in step S302), the CPU 110 determines whether the present RSSI is no more than the upper limit of the prescribed range (step S303). Upon determination that the present RSSI is no more than the upper limit of the prescribed range (NO in step S303), the CPU 110 decrements the transmission power X by the prescribed value (step S304), and returns to the processing of step S303.

Upon determination that the present RSSI is no more than the upper limit of the prescribed range (YES in step S303), the CPU 110 determines whether the RSSI is stabilized to within the prescribed range (step S305). The CPU 110 waits until determination that the RSSI is stabilized to within the prescribed range (NO in step S305).

Upon determination that the RSSI is stabilized to within the prescribed range (YES in step S305), the CPU 110 updates the transmission power setting value to the value X of the present transmission power (step S306). Thereafter, the CPU 110 proceeds to the processing of step S103 in FIG. 4.

Again with reference to FIG. 4, upon determination that the RSSI is stabilized to within the prescribed range (YES in step S105), the CPU 110 sets the electronic timepiece 100 to the second stage state (step S107).

Thereafter, the CPU 110 determines whether the cancellation notification is received from the smartphone 200 (step S108). Upon determination that the cancellation notification from the smartphone 200 is received (YES in step S108), the CPU 110 cuts off the connection with the smartphone 200, returns to the initial state, and proceeds to step S202 of FIG. 5.

Upon determination that the cancellation notification is not received from the smartphone 200 (NO in step S108), the CPU 110 determines whether the electronic timepiece 100 is removed from the arm of the user (step S109). Upon determination that the electronic timepiece 100 is removed from the arm of the user (YES in step S109), the CPU 110 cuts off the connection with the smartphone 200, returns to step S101, and performs setting to the initial state.

Upon determination that the electronic timepiece 100 is not removed from the arm of the user (NO in step S109), the CPU 110 determines whether the RSSI is no more than the prescribed value (step S110). Upon determination that the RSSI is no more than the prescribed value (YES in step S110), the CPU 110 proceeds to the processing of step S210 in FIG. 5, and returns to the first stage state.

Upon determination that the RSSI is no more than the prescribed value (NO in step S110), the CPU 110 determines whether the RSSI is stabilized to within the prescribed range (step S111). Upon determination that the RSSI is stabilized to within the prescribed range (YES in step S111), the CPU 110 returns to the processing of step S108. Upon determination that the RSSI is not stabilized to within the prescribed range (NO in step S111), the CPU 110 executes the transmission power control processing illustrated in FIG. 6 (step S112).

The CPU 110 repeatedly executes the aforementioned communication processing until, for example, power is turned OFF.

According to the aforementioned embodiment as described above, the electronic timepiece 100 controls the transmission power of electromagnetic waves transmitted to the smartphone 200 on the basis of the quality of communication with the smartphone 200. Therefore, even in the case of a change in the communication environment between the electronic timepiece 100 and the smartphone 200, the connection state between the electronic timepiece 100 and the smartphone 200 can be maintained due to control of the transmission power in accordance with such change.

Moreover, according to the aforementioned embodiment, the electronic timepiece 100 controls the transmission power such that the quality of communication with the smartphone 200 is stabilized to within the prescribed range. Therefore, the electronic timepiece 100 can maintain the connection state with the smartphone 200 without lowering of the quality of communication.

Moreover, according to the aforementioned embodiment, when the quality of communication is lower than the lower limit value of the prescribed range, the electronic timepiece 100 causes a gradual increase of the transmission power by a prescribed degree, and when the quality of communication is at least an upper limit value of the prescribed range, causes the transmission power to incrementally decrease by the prescribed degree. Therefore the electronic timepiece 100 in accordance with the communication environment can maintain the quality of communication within a desired range.

Moreover, according to the above embodiment, the electronic timepiece 100 controls the communicator 103, and transmits to the smartphone 200 the advertising packet while incrementally incrementing the transmission power by the prescribed value until the communicator 103 receives the connection request from the smartphone 200 (until change in the signal reception state of the connection request). Thereafter, upon the communicator 103 receiving the connection request, the electronic timepiece 100 establishes the connection with the smartphone 200, and starts the data communication with the smartphone 200 at the transmission power of the advertising packet occurring at the time of reception of the connection request. Therefore, due to the electronic timepiece 100 performing data communication with the smartphone at the transmission power that is the minimum capable of maintaining the connection state with the smartphone 200 at the desired quality of communication, waste of power consumption can be suppressed.

Moreover, in the aforementioned embodiment, the electronic timepiece 100 stores as the transmission power setting value the transmission power of the advertising packet occurring at the time of reception of the connection request, and at the time of the next connection after cutting off of the connection, the electronic timepiece 100 controls the communicator 103 to start the transmission of the advertising packet to the smartphone 200 at the stored transmission power. Therefore, in the case in which there is no change in the communication environment, the connection with the smartphone 200 can be established at a lower power than in the case of transmission of the advertising packet at the maximum output.

Further, the present description is not limited to the aforementioned embodiment, and various modifications are possible.

For example, in the aforementioned embodiment, the electronic timepiece 100 may be further equipped with an accelerometer, and the transmission power can be controlled on the based of the change in the quality of communication and a change in acceleration measured by the accelerometer.

Moreover, in the aforementioned embodiment, as illustrated in FIG. 5, upon determination that the timeout period is not passed (NO in step S206), the CPU 110 performs control (step S207) by updating the transmission power X from the present transmission power X by incrementing by the prescribed value, although such operation is not limiting. Upon determination that the timeout period is not passed (NO in step S206), the CPU 110 may update the transmission power from the present transmission power X by decrementing the transmission power by the prescribed value. Due to such operation, when the transmission power X is decremented by the prescribed value each prescribed period during the interval of reception of the connection request and the connection request becomes unable to be received, the CPU 110 sets the transmission power to the value obtained by incrementing the transmission power at that time by the prescribed value (transmission power on the basis of the transmission power occurring at the time when the signal reception state of the connection request changes). Due to control in this manner, communication can be performed at the smallest power that enables reception of the connection request.

Moreover, in the aforementioned embodiment, although the electronic timepiece 100 stores as the setting value of the transmission power the transmission power of the advertising packet occurring at the time of reception of the connection request, the stored transmission power setting value is not limited to a single value. For example, a first transmission power stored immediately beforehand and a second transmission power set to the transmission power set at the time of the further previous connection may be stored. Here, in the case in which the first transmission power is lower than the second transmission power, processing may be used such that the communicator 103 is controlled to start the transmission of the advertising packet at the stored first transmission power, and when the timeout period passes at this time without the ability to receive the connection request, to switch to the second transmission power for transmission of the advertising packet. Due to such operation, the transmission power values occurring under conditions of the latest connection and under conditions of the previous-to-latest connection can be stored, and thus the connection can be established at a lower power than in the case of transmission of the advertising packet at the maximum output at the time of the next connection.

Moreover, in the aforementioned embodiment, although an example is described in which the time of the electronic timepiece 100 is changed by communication in which the electronic timepiece 100 and the smartphone 200 use Bluetooth (registered trademark), a different communication method can be used, such as by changing the time by communication using a wireless LAN or Wi-Fi (registered trademark).

Moreover, in the aforementioned embodiment, although an example is described in which the time measured by the electronic timepiece 100 is updated to the time measured by the smartphone 200, the time measured by the smartphone 200 may be updated to the time measured by the electronic timepiece 100.

Moreover, although the smartphone 200 and the electronic timepiece 100 are cited as example apparatuses in the aforementioned embodiment of, the present description is not limited to such apparatuses as the equipment suitable for use of the present description, and any wireless communication apparatus capable of wireless communication cay be used, such as a smart watch.

Moreover, although in the aforementioned embodiment an example is described in which the processor that performs the control operations is the CPU 110, the control operations are not limited to software control by the CPU. A hardware configuration may be used by which a part of all of the control operations are performed by hardware such as a dedicated logic circuit.

Moreover, although in the above description an example is described in which the ROM 102 formed from non-volatile memory such as flash memory is used as a computer-readable medium for storage of the program 115 for the time update processing of the present description, such operation is not limiting. Other computer-readable media can be used appropriately such as portable recording media such as a hard disc drive (HDD), a compact disc (CD)-ROM, a digital versatile disc (DVD), or the like. Moreover, the data of the program according to the present description may be applied to a carrier wave as a medium for providing the data via a communication line.

Additionally, specific details such as the configurations, control procedures, display examples described in the above embodiments can be modified appropriately within a scope that does not depart from the gist of the present description.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A wireless communication apparatus comprising:
a wireless communicator configured to perform wireless communication with another wireless communication apparatus; and
a processor,
wherein the processor (i) controls the wireless communicator to transmit to the other wireless communication apparatus prescribed information while incrementally changing transmission power by a prescribed degree until a change occurs in a signal reception state of a connection request from the other wireless communication apparatus, and (ii) starts transmission of the prescribed information to the other wireless communication apparatus during a next communication onwards at a transmission power based on a transmission power used at a time when the change occurs in the signal reception state of the connection request; and
wherein (i) transmission of the prescribed information to the other wireless communication apparatus is started during the next communication onwards at a transmission power based on the transmission power of the prescribed information at a time when the signal reception state of the connection request changes during a latest communication, and (ii) when the connection request cannot be received in a prescribed time, transmission of the prescribed information to the other wireless communication apparatus is started at a transmission power based on the transmission power of the prescribed information at a time when the signal reception state of the connection request changes during a previous-to-latest communication.

2. The wireless communication apparatus according to claim 1, wherein:
after the signal reception state of the connection request transmitted from the other wireless communication apparatus changes, and during a next communication onwards, the processor starts the transmission of the prescribed information to the other wireless communication apparatus at the transmission power used at the time of the change of the signal reception state of the connection request.

3. The wireless communication apparatus according to claim 1, wherein:
after the signal reception state of the connection request transmitted from the other wireless communication apparatus changes, and during a next communication onwards, the processor starts the transmission of the prescribed information to the other wireless communication apparatus at a transmission power that is the transmission power used at the time of the change of the signal reception state of the connection request incremented by the prescribed degree.

4. The wireless communication apparatus according to claim 1, wherein:

the processor controls the transmission power such that a quality of communication with the other wireless communication apparatus is stabilized to within a prescribed range.

5. The wireless communication apparatus according to claim 4, wherein:
when the quality of communication is less than a lower limit value of the prescribed range, the processor causes an increase in the transmission power by the prescribed degree.

6. The wireless communication apparatus according to claim 4, wherein:
when the quality of communication is greater than an upper limit value of the prescribed range, the processor causes a decrease in the transmission power by the prescribed degree.

7. The wireless communication apparatus according to claim 4, wherein:
based on the quality of communication, the processor changes the transmission power, and starts transmission of the prescribed information to the other wireless communication apparatus during the next communication onwards.

8. The wireless communication apparatus according to claim 1, further comprising:
a storage configured to store the transmission power, wherein:
the processor causes the storage to store the transmission power as a first transmission power based on the transmission power of the prescribed information at the time when the signal reception state of the connection request changes during the latest communication, and causes the storage to store the transmission power as a second transmission power based on the transmission power of the prescribed information at the time when the signal reception state of the connection request changed during the previous-to-latest communication.

9. The wireless communication apparatus according to claim 8, wherein:
the processor starts transmission of the prescribed information to the other wireless communication apparatus at the first transmission power during the next communication onwards, and starts transmission of the prescribed information to the other wireless communication apparatus at the second transmission power when the signal reception state of the connection request is unchanged for a prescribed period.

10. An electronic timepiece comprising:
the wireless communication apparatus according to claim 1; and
a display configured to display time.

11. A transmission power control method for a wireless communication apparatus including a wireless communicator for performing wireless communication with another wireless communication apparatus, the method comprising:
controlling the wireless communicator to transmit to the other wireless communication apparatus prescribed information while incrementally changing transmission power by a prescribed degree until a change occurs in a signal reception state of a connection request from the other wireless communication apparatus; and
starting transmission of the prescribed information to the other wireless communication apparatus during a next communication onwards at a transmission power based on a transmission power used at a time when the change occurs in the signal reception state of the connection request;
wherein (i) transmission of the prescribed information to the other wireless communication apparatus is started during the next communication onwards at a transmission power based on the transmission power of the prescribed information at a time when the signal reception state of the connection request changes during a latest communication, and (ii) when the connection request cannot be received in a prescribed time, transmission of the prescribed information to the other wireless communication apparatus is started at a transmission power based on the transmission power of the prescribed information at a time when the signal reception state of the connection request changes during a previous-to-latest communication.

12. A non-transitory computer-readable storage medium having stored thereon a program executable by a computer of a wireless communication apparatus that includes a wireless communicator for performing wireless communication with another wireless communication apparatus, the program causing the computer to perform operations comprising:
controlling the wireless communicator to transmit to the other wireless communication apparatus prescribed information while incrementally changing transmission power by a prescribed degree until a change occurs in a signal reception state of a connection request from the other wireless communication apparatus; and
starting transmission of the prescribed information to the other wireless communication apparatus during a next communication onwards at a transmission power based on a transmission power used at a time when the change occurs in the signal reception state of the connection request;
wherein (i) transmission of the prescribed information to the other wireless communication apparatus is started during the next communication onwards at a transmission power based on the transmission power of the prescribed information at a time when the signal reception state of the connection request changes during a latest communication, and (ii) when the connection request cannot be received in a prescribed time, transmission of the prescribed information to the other wireless communication apparatus is started at a transmission power based on the transmission power of the prescribed information at a time when the signal reception state of the connection request changes during a previous-to-latest communication.

* * * * *